United States Patent
Xu et al.

(10) Patent No.: US 9,860,533 B2
(45) Date of Patent: Jan. 2, 2018

(54) CROSS-LAYER CROSS-CHANNEL SAMPLE PREDICTION

(75) Inventors: Lidong Xu, Beijing (CN); Yu Han, Beijing (CN); Wenhao Zhang, Beijing (CN); Yi-Jen Chiu, San Jose, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 911 days.

(21) Appl. No.: 13/977,578

(22) PCT Filed: Jun. 26, 2012

(86) PCT No.: PCT/CN2012/077514
§ 371 (c)(1),
(2), (4) Date: Oct. 2, 2013

(87) PCT Pub. No.: WO2014/000154
PCT Pub. Date: Jan. 3, 2014

(65) Prior Publication Data
US 2014/0192877 A1    Jul. 10, 2014

(51) Int. Cl.
| H04N 19/00 | (2014.01) |
| H04N 19/593 | (2014.01) |
| H04N 19/33 | (2014.01) |
| H04N 19/105 | (2014.01) |
| H04N 19/147 | (2014.01) |
| H04N 19/186 | (2014.01) |
| H04N 19/187 | (2014.01) |

(Continued)

(52) U.S. Cl.
CPC ..... *H04N 19/00763* (2013.01); *H04N 19/105* (2014.11); *H04N 19/147* (2014.11); *H04N 19/186* (2014.11); *H04N 19/187* (2014.11); *H04N 19/33* (2014.11); *H04N 19/573* (2014.11); *H04N 19/59* (2014.11)

(58) Field of Classification Search
CPC .......... H04N 19/00763; H04N 19/105; H04N 19/147; H04N 19/186; H04N 19/187; H04N 19/33; H04N 19/573; H04N 19/59
USPC ........................................... 375/240.13, 240
See application file for complete search history.

(56) References Cited

U.S. PATENT DOCUMENTS

| 6,043,838 A * | 3/2000 | Chen ................. G06T 7/0022 |
| | | 348/42 |
| 2008/0089411 A1* | 4/2008 | Wenger ............... H04N 19/105 |
| | | 375/240.12 |
| 2009/0060035 A1 | 3/2009 | He et al. |

(Continued)

FOREIGN PATENT DOCUMENTS

| CN | 1226786 A | 8/1999 |
| CN | 101578882 A | 11/2009 |

(Continued)

OTHER PUBLICATIONS

First Office Action and Search Report for Chinese Patent Application No. 201280073472.9, dated Jan. 19, 2016, 8 pages.

(Continued)

*Primary Examiner* — Mohammed Rahaman
*Assistant Examiner* — Jimmy S Lee
(74) *Attorney, Agent, or Firm* — Jordan IP Law, LLC

(57) ABSTRACT

Systems, apparatus and methods are described including operations for video coding including cross-layer cross-channel sample prediction.

19 Claims, 8 Drawing Sheets

(51) Int. Cl.
H04N 19/573 (2014.01)
H04N 19/59 (2014.01)

(56) References Cited

U.S. PATENT DOCUMENTS

| | | | | |
|---|---|---|---|---|
| 2009/0279614 | A1* | 11/2009 | Kim | H04N 19/105 375/240.26 |
| 2010/0128786 | A1* | 5/2010 | Gao | H04N 19/147 375/240.13 |
| 2010/0135393 | A1* | 6/2010 | Ying Gao | H04N 19/00315 375/240.15 |
| 2013/0010863 | A1* | 1/2013 | Wu | H04N 21/8451 375/240.12 |
| 2013/0083855 | A1* | 4/2013 | Kottke | H04N 19/46 375/240.18 |
| 2013/0114893 | A1* | 5/2013 | Alakuijala | H04N 19/463 382/166 |

FOREIGN PATENT DOCUMENTS

| | | |
|---|---|---|
| CN | 101977315 A | 2/2011 |
| EP | 1509045 A2 | 2/2005 |
| WO | 2008128898 A1 | 10/2008 |
| WO | 2014/000154 A1 | 1/2014 |

OTHER PUBLICATIONS

Yoshitaka Morigami et al., "Low-Complexity Algorithm for Inter-Layer Residual Prediction of H.264/SVC"; 2009 16th IEEE International Conference on Image Processing (IPIP); Nov. 7, 2009, pp. 3761-3764.

Supplementary Partial European Search Report for EP Patent Application No. EP12880227, dated Mar. 7, 2016, 7 pages.
International Search Report and Written Opinion received for PCT Patent Application No. PCT/CN2012/077514, dated Apr. 11, 2013, 10 Pages.
Supplementary Partial European Search Report for EP Patent Application No. EP12880227, dated Jul. 5, 2016, 20 pages.
Amonou, et al., "Improving inter-layer prediction", Klagenfurt, AT; Joint Video Team of ISO/IEC JTC2/SC29/WG11 and ITU-T SG16, No. JVT-T053, Jul. 15, 2006.
Chiu et al., "Cross-channel intra chroma residual prediction", Motion Picture Expert Group or ISO/IEC JTC1/SC29/WG11, No. M21726, Nov. 27, 2011.
Cho et al., "New Intra Luma Prediction Mode in H.264/AVC Using Collocated Weighted Chroma Pixel Value", Advanced Concepts for Intelligent Vision Systems Lecture Notes in Computer Science, Berlin, DE, pp. 344-353, Jan. 1, 2006.
Kawamura, et al., "Chroma intra prediction based on residual luma samples", Joint Collaborative Team on Video Coding of ISO/IEC JTC1/SC29/WG11 and ITU-T SG16, No. JCTVC-F095, Jul. 1, 2011.
Luthra, Ajay, "Draft requirements for the scalable enhancements of HEVC", Motion Picture Expert Group or ISO/IEC JTC1/SC29/WG11, No. M23513, Feb. 6, 2012.
Shen, et al., "CE7: Adaptive inter-layer prediction", Joint Video Team of ISO/IEC JTC1/SC29/WG11 and ITU-T SG16, No. JVT-V039, Jan. 10, 2007.
Zhang, et al., A second-order-residual (SOR) coding approach to high-bit-rate video compression, Biomedical Photonics and Optoelectronic Imaging, Beijing, China, vol. 7543, Jan. 17, 2010.
Zhang, et al., "Multi-order-residual (MOR) video coding: framework, analysis, and performance", Visual Communications and Image Processing, Huang han, An Hui, China, Jul. 11, 2010.

* cited by examiner

CROSS-LAYER CROSS-CHANNEL SAMPLE PREDICTION

BACKGROUND

A video encoder compresses video information so that more information can be sent over a given bandwidth. The compressed signal may then be transmitted to a receiver that decodes or decompresses the signal prior to display.

High Efficient Video Coding (HEVC) is a new video compression standard planned to be finalized by the end 2012. It is currently under development by the Joint Collaborative Team on Video Coding (JCT-VC) formed by ISO/IEC Moving Picture Experts Group (MPEG) and ITU-T Video Coding Experts Group (VCEG). The team will also standardize a Scalable Video Coding (SVC) extension of HEVC standard.

In the current HEVC specification, a picture is coded in the unit of Largest Coding Unit (LCU). A LCU can be a 128×128 block, a 64×64 block, a 32×32 block or a 16×16 block. A LCU can be encoded directly or be divided into 4 Coding Unit (CU) for next level encoding. For a CU in one level, it can be encoded directly or be further divided into next level for encoding. The smallest CU is 8×8.

In general, at each level a CU whose size is 2N×2N, may be divided into different size of Prediction Units (PU) for prediction. For intra coding, a 2N×2N CU can be encoded in one 2N×2N PU or in four N×N PUs. For inter coding, a 2N×2N CU can be encoded in one 2N×2N PU, or two 2N×N PUs, or two N×2N PUs, or 0.5N×2N PU+1.5N×2N PU, or 1.5N×2N PU+0.5N×2N PU, or 2N×0.5N PU+2N×1.5N PU, or 2N×1.5N PU+2N×0.5N PU, or four N×N PUs.

In non-gray pictures, a picture consists of the data of three channels, i.e., Luma channel Y and two Chroma channel U and V. And correspondingly, a PU consists of one luma block Y and two Chroma blocks U and V.

In an HEVC encoder, after intra prediction (Intra-frame Prediction module) or inter prediction (Motion Estimation and Motion Compensation modules) are performed, the prediction samples corresponding to the difference between an input PU and the predicted PU are transformed and quantized for entropy coding. When a PU is encoded in intra coding mode, different intra prediction modes may be applied including DC prediction, planar prediction, horizontal prediction, vertical prediction and so forth.

As the standardization of the main part of HEVC is reaching completion, JCT-VC has started planning to add a Scalable Video Coding (SVC) extension into HEVC standard. SVC is an important issue to cope with the heterogeneity of networks and devices in modern video service environment. A SVC bit stream contains several subset bit streams that can themselves be decoded, and these sub streams represent the source video content with different resolution, frame rate, quality, bit depth, and etc. The scalabilities are achieved by using a multi-layer coding structure. In general, there's one Base Layer and several Enhancement Layers in a SVC system.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
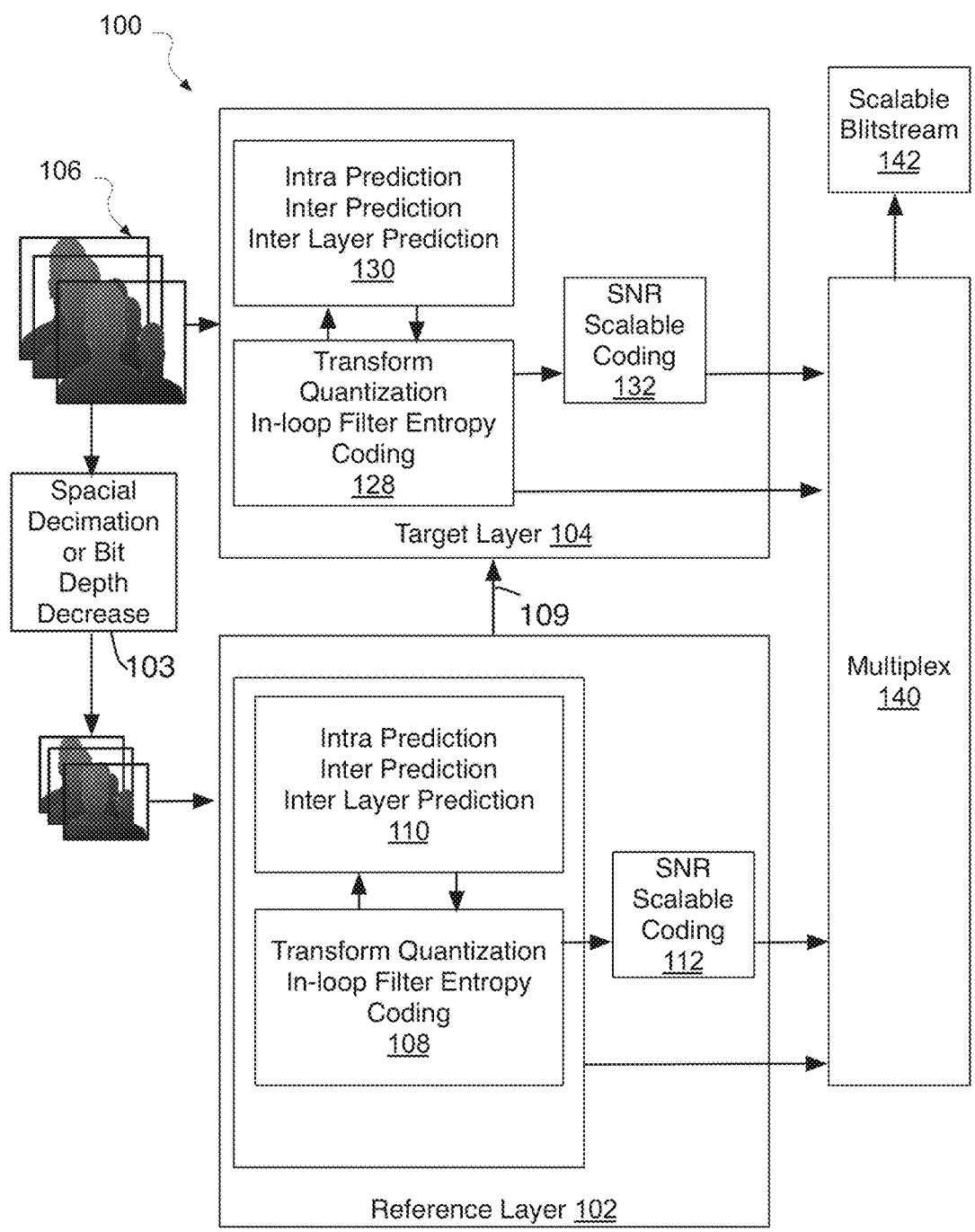
FIG. 1 is an illustrative diagram of an example video coding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for video coding including cross-layer cross-channel sample prediction.

As described above, in scalable video coding, a base layer may be encoded at first, and then enhancement layers may be encoded. In a cross-layer prediction, the information of the base layer can be used to encode enhancement layers. When the input video sequence is in color format, it will have three color channels, i.e., one Luma channel Y and two Chroma channels U and V. Typically, the three channels may be predicted, transformed and quantized separately for entropy coding.

However, as will be described in greater detail below, the three channels are not completely decorrelated. Furthermore, if any two of the three channels use the same prediction type and/or the same prediction mode, the two channels may still have strong correlations. Therefore, cross-layer cross-channel sample prediction may be utilized to improve enhancement layer coding efficiency.

FIG. 1 is an illustrative diagram of an example video coding system 100, arranged in accordance with at least some implementations of the present disclosure. In some examples, video coding system 100 may include additional items that have not been shown in FIG. 1 for the sake of clarity. For example, video coding system 100 may include a processor, a radio frequency-type (RF) transceiver, a display, and/or an antenna. Further, video coding system 100 may include additional items such as a speaker, a microphone, an accelerometer, memory, a router, network interface logic, etc. that have not been shown in FIG. 1 for the sake of clarity.

As used herein, the term "coder" may refer to an encoder and/or a decoder. Similarly, as used herein, the term "coding" may refer to encoding via an encoder and/or decoding via a decoder. For example a video encoder and video decoder may both be examples of coders capable of coding.

As illustrated, video coding system 100 may include an SVC encoder with one reference layer 102 (e.g., a base layer or a lower enhancement layer) and one target layer 104 (e.g., an enhancement layer). For example, two layers (e.g., lower reference layer 102 and target layer 104) are illustrated; however, any number of enhancement layers may be utilized in addition to a base layer. The base layer may be encoded in a manner that is compatible with the HEVC standard, and may be identified as layer 0. Enhancement layers may be identified as layers 1, 2, etc. When coding a target layer 104 with a layer identification equal to N, all the layers with layer identification less than N may be available. In such a situation, the picture belonging to target layer 104 can be predicted from a picture from one lower reference layer 102 or previously coded pictures in the same layer. Inter-layer prediction, which reuses coding information from reference layer 102, is one of the key features to ensure the compression efficiency of a SVC codec design.

Similarly, during the operation of video coding system 100 on reference layer 102, current video information may be provided to a spatial decimation or bit depth decrease module 103 in the form of a frame of video data 106. The current video frame may be split into Largest Coding Units (LCUs) and then passed to a transform quantization in-loop filter entropy coding module 108. Transform quantization in-loop filter entropy coding module 108 may perform known video transform and quantization processes, may perform known entropy coding processes, and may perform known de-quantization and inverse transform processes to implement the inverse of the transform and quantization operations. An intra prediction and inter prediction module 110 may perform intra-frame prediction and inter-frame prediction operations. An SNR (signal to noise ratio) scalable coding module 112 may perform scalable coding on the output from transform quantization in-loop filter entropy coding module 108 and intra prediction and inter prediction module 110.

Similar operations may be performed for target layer 104 via a transform quantization in-loop filter entropy coding module 128, an intra prediction and inter prediction module 130, and/or an SNR scalable coding module 132.

A multiplex module 140 may receive output from transform quantization in-loop filter entropy coding module 108 of reference layer 102, SNR scalable coding module 112 of reference layer 102, transform quantization in-loop filter entropy coding module 128 of target layer 104, and/or SNR scalable coding module 132 of target layer 104, which all may be mixed for transmission as a scalable bitstream 142.

In operation, video coding system 100 may implement operations for cross-layer cross-channel sample prediction. For example, when coding a coding unit of target layer 104, a co-located coding unit can be found in the reference layer 102 for use in such prediction. As will be described in greater detail below, a target prediction sample of the current coding unit can be predicted from the co-located reference layer 102 reconstructed reference sample. In some examples, such operations for cross-layer cross-channel sample prediction may occur during inter layer prediction module 130.

As will be discussed in greater detail below, video coding system 100 may be used to perform some or all of the various functions discussed below in connection with FIGS. 2 and/or 3.

Figure 2:
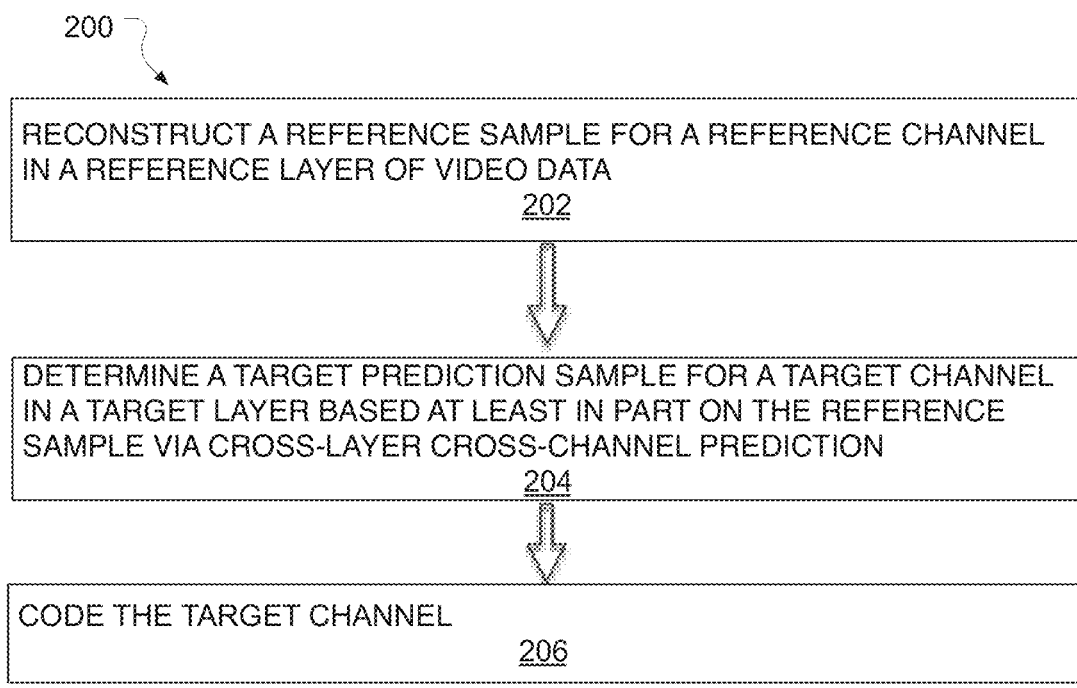
FIG. 2 is a flow chart illustrating an example video coding process.

FIG. 2 is a flow chart illustrating an example video coding process 200, arranged in accordance with at least some implementations of the present disclosure. In the illustrated implementation, process 200 may include one or more operations, functions or actions as illustrated by one or more of blocks 202, 204, and/or 206. By way of non-limiting example, process 200 will be described herein with reference to example video coding system 100 of FIGS. 1 and/or 6.

Process 200 may be utilized as a computer-implemented method for cross-layer cross-channel sample prediction. Process 200 may begin at block 202, "RECONSTRUCT A REFERENCE SAMPLE FOR A REFERENCE CHANNEL IN A REFERENCE LAYER OF VIDEO DATA", where a reference sample may be reconstructed for a reference channel in a reference layer of video data. For example, the reference sample may be reconstructed for a reference channel in a reference layer of video data via a video coder.

Processing may continue from operation 202 to operation 204, "DETERMINE A TARGET PREDICTION SAMPLE FOR A TARGET CHANNEL IN A TARGET LAYER BASED AT LEAST IN PART ON THE REFERENCE SAMPLE VIA CROSS-LAYER CROSS-CHANNEL PREDICTION", where a target prediction sample may be determined for a target channel in a target layer based at least in part on the reference sample. For example target prediction sample may be determined for a target channel in a target layer based at least in part on the reference sample via the video coder. Such a determination may be made via cross-layer cross-channel prediction.

Processing may continue from operation 204 to operation 206, "CODE THE TARGET CHANNEL", where the target channel may be coded. For example, the target channel may be coded based at least in part on the determined target prediction sample.

In operation, the target channel may be a different channel than the reference channel. For example, when the reference channel includes a luma channel, the target channel may include a chroma channel; and when the reference channel includes a chroma channel, the target channel may include one of a luma channel or another chroma channel.

Additionally or alternatively, the target layer may be a higher layer than the reference layer. For example, when the reference layer is a base layer, the target layer may be an enhancement layer, and when the reference layer is an enhancement layer, the target layer may be a higher enhancement layer. In other examples, the target layer may be in the same layer as the reference layer.

Some additional and/or alternative details related to process 200 may be illustrated in one or more examples of implementations discussed in greater detail below with regard to FIG. 3.

Figure 3:
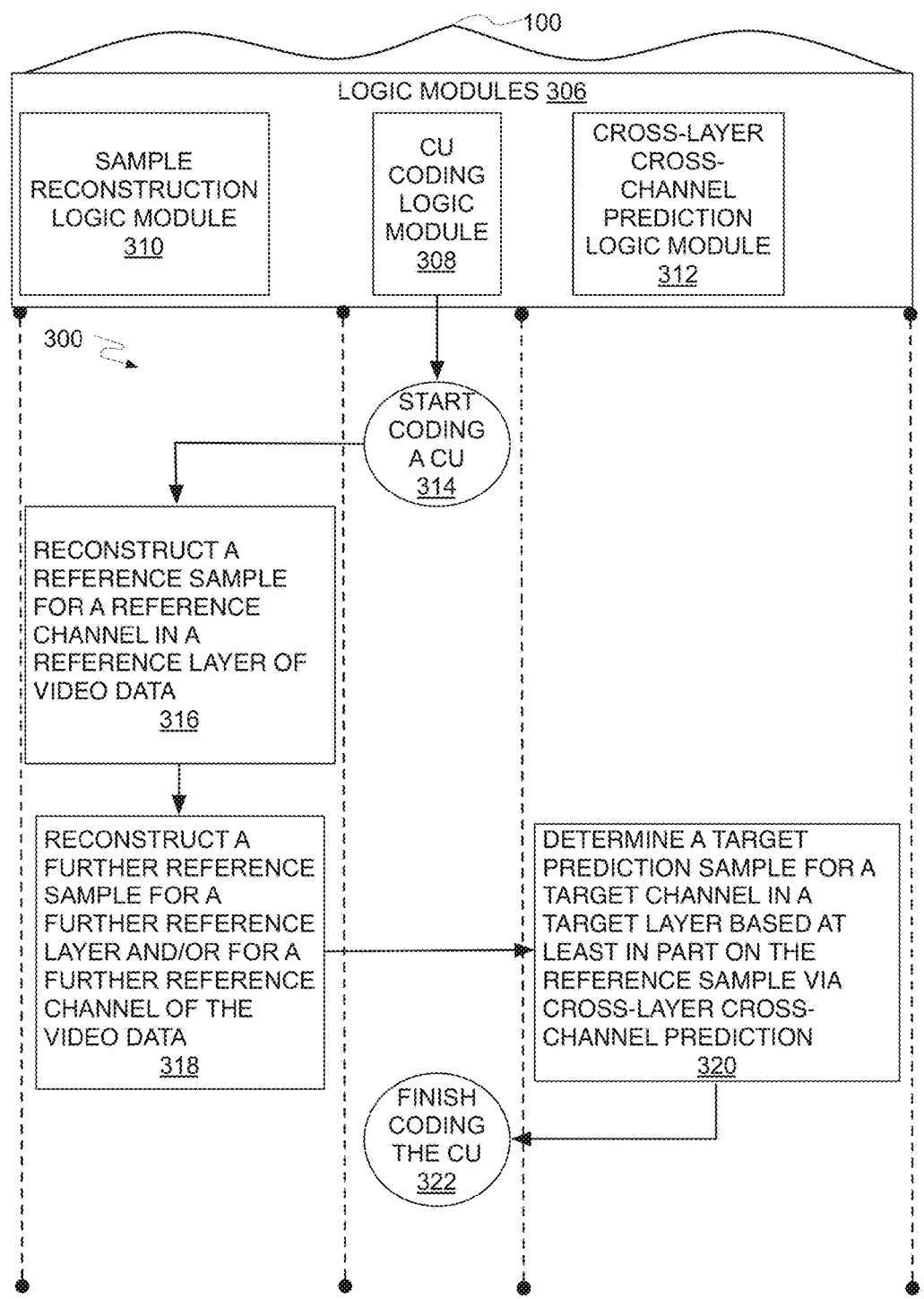
FIG. 3 is an illustrative diagram of an example video coding process in operation.

FIG. 3 is an illustrative diagram of example video coding system 100 and video coding process 300 in operation, arranged in accordance with at least some implementations of the present disclosure. In the illustrated implementation, process 300 may include one or more operations, functions or actions as illustrated by one or more of actions 314, 316, 318, 320, and/or 322. By way of non-limiting example, process 300 will be described herein with reference to example video coding system 100 of FIGS. 1 and/or 6.

In the illustrated implementation, video coding system 100 may include logic modules 306, the like, and/or combinations thereof. For example, logic modules 306, may include cu coding logic module 308, sample reconstruction logic module 310, cross-layer cross-channel prediction logic module 312, the like, and/or combinations thereof. Sample reconstruction logic module 310 of video coding system 100 may be communicatively coupled to the one or more processors and may be configured to reconstruct a reference sample for a reference channel in a reference layer of video data. Cross-layer cross-channel prediction logic module 312 of video coding system 100 may be communicatively coupled to sample reconstruction logic module 310 and may be configured to determine a target prediction sample for a target channel in a target layer based at least in part on the reference sample via cross-layer cross-channel prediction. The target channel may be a different channel than the reference channel. Although video coding system 100, as shown in FIG. 3, may include one particular set of blocks or actions associated with particular modules, these blocks or actions may be associated with different modules than the particular module illustrated here.

Process 300 may be utilized as a computer-implemented method for cross-layer cross-channel sample prediction. Process 300 may begin at block 314, "START CODING A CU", where coding may be started. For example, a coding unit may be decoded via cu coding logic module 308. Although process 300, as illustrated, may be directed to decoding, the concepts and/or operations described may be applied in the same or similar manner to coding in general, including in encoding.

Processing may continue from operation 314 to operation 316, "RECONSTRUCT A REFERENCE SAMPLE FOR A REFERENCE CHANNEL IN A REFERENCE LAYER OF VIDEO DATA", where a reference sample may be reconstructed for a reference channel in a reference layer of video data. For example, the reference sample may be reconstructed for a reference channel in a reference layer of video data via sample prediction logic module 310.

Processing may continue from operation 316 to operation 318, "RECONSTRUCT A FURTHER REFERENCE SAMPLE FOR A FURTHER REFERENCE LAYER AND/OR FOR A FURTHER REFERENCE CHANNEL OF THE VIDEO DATA", where a further reference sample may be reconstructed for a further reference channel in a further reference layer of video data. For example, the further reference sample may be reconstructed based at least in part on the further reference sample via sample prediction logic module 310.

Processing may continue from operation 316 and/or 318 to operation 320. "DETERMINE A TARGET PREDICTION SAMPLE FOR A TARGET CHANNEL IN A TARGET LAYER BASED AT LEAST IN PART ON THE REFERENCE SAMPLE VIA CROSS-LAYER CROSS-CHANNEL PREDICTION", where a target prediction sample may be determined for a target channel in a target layer based at least in part on the reference sample and/or the further reference sample. For example, target prediction sample may be determined for a target channel in a target layer based at least in part on the reference sample and/or the further reference sample via the video coder. Such a determination may be made via cross-layer cross-channel prediction via cross-layer cross-channel prediction logic module 312.

Processing may continue from operation 320 to operation 322, "FINISH CODING THE CU", where the target unit may be coded. For example, the target unit may be coded based at least in part on the determined target prediction sample via cu coding logic module 308.

In examples where processing continues from operation 316 to operation 320, the target prediction sample may be determined based at least in part on the reference sample reconstructed at operation 316. Some additional and/or alternative details related to operation 316 may be illustrated in one or more examples of implementations discussed in greater detail below with regard to FIG. 4.

In examples where processing continues from operation 318 to operation 320, the target prediction sample may be determined based at least in part on the further reference sample reconstructed at operation 318. Alternatively, the target prediction sample may be determined based at least in part on the further reference sample reconstructed at operation 318 in addition to the reference sample reconstructed at operation 316. Some additional and/or alternative details related to operation 318 may be illustrated in one or more examples of implementations discussed in greater detail below with regard to FIG. 5.

In operation, process 300 (and/or process 200) may operate so the determination of the target prediction sample may be performed during scalable video coding for one or more scalability types, including spatial scaling, temporal scaling, quality scaling, and bit-depth scaling.

In some examples, the determination of the target prediction sample for the target channel in the target layer may include selection of the reference layer and reference channel during decoding based at least in part on a flag associated with the target prediction sample during encoding. In other examples, a video decoder may make calculations that parallel those calculations in the video decoder in order to determine how the video decoder would have encoded the video data. In such an example, video decoder may operate without such a flag associated with the target prediction sample block during encoding.

In some examples, parameter values may be processed by receiving, via a decoder portion of a coder, parameter values from an encoder portion of the coder. Alternatively, parameter values may be processed by determining, via a decoder portion of a coder, parameter values independent from and in parallel with an encoder portion of the coder. Such parameter values may be associated with performing cross-layer cross-channel prediction.

In some examples, the determination of the target prediction sample may include applying one of a linear relation model or a non-linear relation model based at least in part on the parameter values. Model parameters may be processed by determining the target prediction sample by adaptively applying one or more fixed relation model parameters. Alternatively, model parameters may be processed by adaptively determining one or more relation model parameters in response to model parameters associated with one or more layers and/or channels. The determination of the target prediction sample for the target channel via cross-layer cross-channel prediction may be adaptively applied based at least in part on a rate distortion cost.

More specifically, process 300 (and/or 200) may utilize a cross-layer cross-channel sample prediction model. In such an example, assuming that samples of channel A are predicted from reconstructed samples of channel B (a similar process can be applied to predict samples of channel A from reconstructed samples of channel B and C, and channel A, B and C may be located in different layers), a linear or non-linear model may be applied for the prediction. For instance, for a sample position k, the channel A sample value A(k) may be predicted from reconstructed channel B sample value B'(k) of position k using the following expression.

$$A^P(k)=f(B'(k)) \qquad (1)$$

Where $A^P(k)$ is the predicted value, $f(\bullet)$ may be a linear or non-linear function or transform. B'(k) may be in a predefined layer in both the encoder and the decoder sides. Otherwise, B'(k) may be any of the available layers, which depend on the results of an optimization calculation, information regarding B'(k) will be sent to the decoder. In various implementations, parameters of $f(\bullet)$ may be predefined fixed values or may be generated adaptively. Samples used to generate parameters of $f(\bullet)$ may be input samples and/or reconstructed samples. In various implementations, the samples used to generate the parameters of $f(\bullet)$ and the samples used to predict channel A may be in the same layer or not. In various implementations, the samples used to generate parameters of $f(\bullet)$ may be in the co-located positions or in the neighboring positions. Parameters of $f(\bullet)$ may then be obtained, if they are not fixed values, using techniques such as, for example, linear least squares, non-linear least squares, weighted least squares or other optimization methods.

In general, a linear form of $f(\bullet)$ may be expressed as follows $$A^P(k)=a*B'(k)+b \qquad (2)$$

Where a and b are model parameters. They may be fixed values, or be determined at decoder side, or be determined at encoder side and then be transmitted to decoder side.

In general, a non-linear form of $f(\bullet)$ may be expressed as follows $$A^P(k)=a(k)*B'(k)+b(k) \qquad (3)$$

Where a(k) and b(k) are non-linear equation parameters. In various implementations, parameters a(k) and b(k) may be determined by the value of B'(k). For example, the range of values of B'(k) may be divided into M smaller subsets S(k) of samples values. Each subset S(k) may then be assigned different values for a(k) and b(k) to be used in Eq. (3) so that when the value of B'(k) for a particular samples position lies within a given subset S(k) the corresponding values for a(k) and b(k) are applied to predict the sample value $A^P(k)$ for that position.

Parameters of $f(\bullet)$ in an enhancement layer may also be predicted from parameters of $f(\bullet)$ in a base layer and/or lower layers. In various implementations, parameters of $f(\bullet)$ may be adaptively generated in the decoder side, or be transmitted to the decoder.

For example, process 300 (and/or 200) may adaptively generate model parameters from other model parameters in the same layer, adaptively generate enhancement layer model parameters from base layer model parameters, and/or adaptively generate higher layer model parameters from lower layers model parameters.

Similarly, process 300 (and/or 200) may adaptively generate the model parameters on the decoder side based on the information of reconstructed samples in the same layer, adaptively generate enhancement layers model parameters on the decoder side based on the information of reconstructed samples in base layer, adaptively generate enhancement layers model parameters on the decoder side based on the information of reconstructed samples in base layer and the same enhancement layer, and/or adaptively generate higher layer model parameters on the decoder side based on the information of reconstructed samples in lower layers.

Likewise, process 300 (and/or 200) may adaptively generate the optimal model parameters on the encoder side using reconstructed samples, then transmit the information of generation method to the decoder (e.g., model parameters can be generated from reconstructed samples in a current layer, a lower layer, or a base layer); adaptively generate the enhancement layer model parameters on the encoder side based on input samples and reconstructed samples in the same layer, and then encode and transmit the generated model parameters to the decoder; adaptively generate the enhancement layer model parameters on the encoder side based on input samples in this layer and reconstructed samples in the base layer, and then encode and transmit the generated model parameters to the decoder; and/or adaptively generate the higher layer model parameters on the encoder side based on input samples in this layer and reconstructed samples in lower layers, and then encode and transmit the generated model parameters to the decoder.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
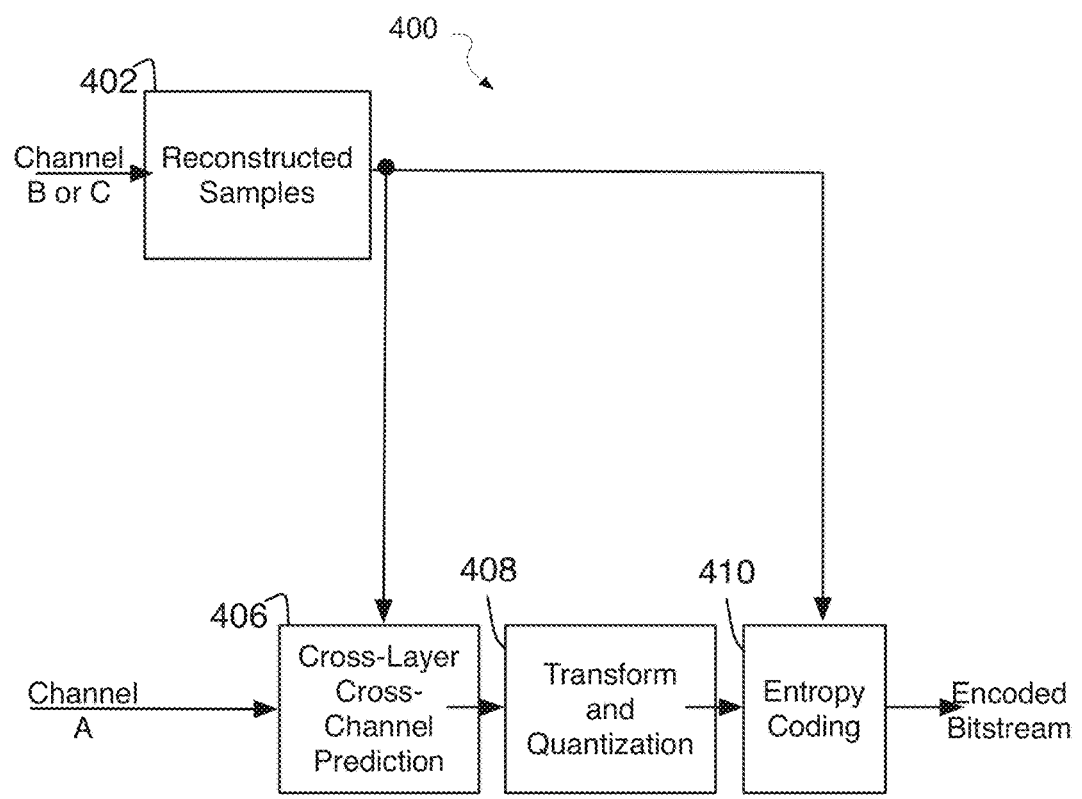
FIG. 4 is an illustrative diagram of example cross-layer cross-channel sample prediction scheme.

FIG. 4 is an illustrative diagram of example cross-layer cross-channel sample prediction scheme in accordance with at least some implementations of the present disclosure. In the illustrated implementation, system 100 of FIG. 1 may implement scheme 400. In scheme 400, the reconstructed predicted samples of a first channel (B or C) in a first layer (e.g., a reference layer such as a base layer or lower enhancement layer) are used to predict the samples of a second channel (A) in a second layer (e.g. a target layer such as a higher enhancement layer) and then the encoded samples of reference layer channel B or C and the resulting cross-layer cross-channel predicted samples of target layer channel A (after being encoded) are subjected to entropy encoding.

In various implementations, the channels A, B or C may be located in various layers. For example, when the reference layer associated with channel B is a base layer, the target layer associated with channel A may be an enhancement layer. Likewise, when the reference layer associated with channel B is an enhancement layer, the target layer with channel A may be a higher enhancement layer. Alternatively, channel A and channel B may be located in the same layer in some examples.

In various implementations, the channels A, B or C may be any one of a luma channel (Y) or chroma channel (U and V), and each of channels A, B or C may be distinct (i.e., different from the other channels). In various implementations, channel A may be a luma channel, and channels B and C may be chroma channels. In other implementations, channel A may be a chroma channel, and one of channels B and C may be a luma channel while the other channel of channels B and C may be the other chroma channel.

Accordingly, target layer channel A may differ from reference layer channel B based on variations in channel type, variation in layer type, or both variation in layer type and variation in channel type.

As depicted in scheme 400, the predicted samples of reference layer channel B or C may be reconstructed at block 402 and provided to a cross-layer cross-channel prediction block 406. At block 406, the reconstructed samples of reference layer channel B or C may be used to predict the samples of target layer channel A. The predicted samples of target layer channel A may then be transformed and quantized at block 408 before being entropy coded at block 410 along with the transformed and quantized reference layer channel B or C samples obtained from block 402.

In operation, scheme 400 may be utilized to predict samples of channel A in an enhancement layer from reconstructed samples of channel B or channel C in a base layer, a lower layer, or the same layer as channel A.

Figure 5:
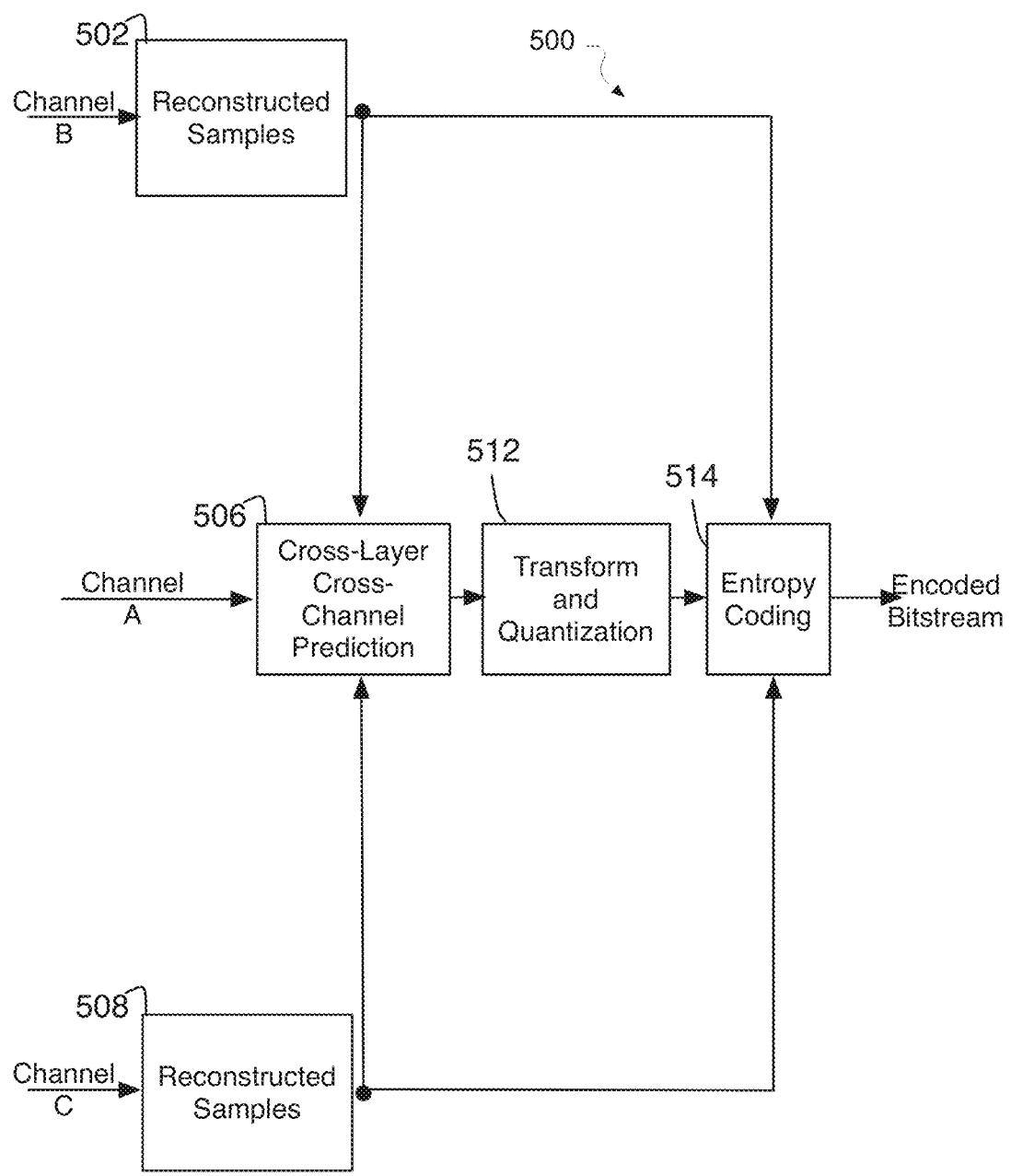
FIG. 5 is an illustrative diagram of a further example cross-layer cross-channel sample prediction scheme.

FIG. 5 is an illustrative diagram of a further example cross-layer cross-channel sample prediction scheme in accordance with at least some implementations of the present disclosure. In the illustrated implementation, system 100 of FIG. 1 may implement scheme 500. In scheme 500, the target prediction sample of channel A may be determined based at least in part on s reference sample of channel B and a further reference sample of channel C.

In scheme 500, the reconstructed predicted samples of two channels (reference layer channel B and further reference layer channel C) are used to predict the samples of a third channel (A), and then the encoded samples of reference layer channel B and further reference layer channel C and the cross-layer cross-channel predicted samples of target layer channel A (after being encoded) are subjected to entropy encoding.

In various implementations, the channels A, B or C may be located in various layers. For example, when the reference layer associated with channel B is a base layer, the target layer associated with channel A may be an enhancement layer. Likewise, when the reference layer associated with channel B is an enhancement layer, the target layer with channel A may be a higher enhancement layer. Similarly, the further reference layer associated with channel C may be in the same or different layer from the reference layer associated with channel B.

In various implementations, the channels A, B or C may be any one of a luma channel (Y) or chroma channel (U and V), and each of channels A, B or C may be distinct (i.e., different from the other channels). In various implementations, channel A may be a luma channel, and channels B and C may be chroma channels. In other implementations, channel A may be a chroma channel, and one of channels B and C may be a luma channel while the other channel of channels B and C may be the other chroma channel.

Accordingly, target layer channel A may differ from reference layer channel B and differ from further reference layer channel C based on variations in channel type, variation in layer type, or both variation in layer type and variation in channel type.

As depicted in scheme 500, the predicted samples of reference layer channel B may be as reconstructed at block 502 and provided to a cross-layer cross-channel prediction block 506. Similarly, the predicted samples of further reference channel C may be reconstructed at block 508 and provided to cross-channel prediction block 506. At block 506, the reconstructed samples of both reference layer channel B and further reference layer channel C may be used to predict the samples of target layer channel A as described herein. The resulting predicted samples of target layer channel A may then be transformed and quantized at block 512 before being entropy coded at block 514 along with the encoded samples of channels B and C.

In operation, scheme 500 may be utilized to predict samples of channel A in an enhancement layer from reconstructed samples of channel B and channel C in a base layer, a lower layer, or the same layer as channel A. This reference channel B or C may be encoded by cross-layer cross-channel sample prediction.

In some examples, when the input YUV data are in the format of YUV420 or YUV422, the samples block size of U and V channels are smaller than that of the Y channel. In these cases, if the Y channel and U or V channels are in the same spatial resolution layer, down-sampling may be applied on the Y channel samples block if it is used to predict U and/or V channel sample blocks, or up-sampling may be applied on U and/or V samples blocks if they are used to predict the Y channel samples block.

Figure 6:
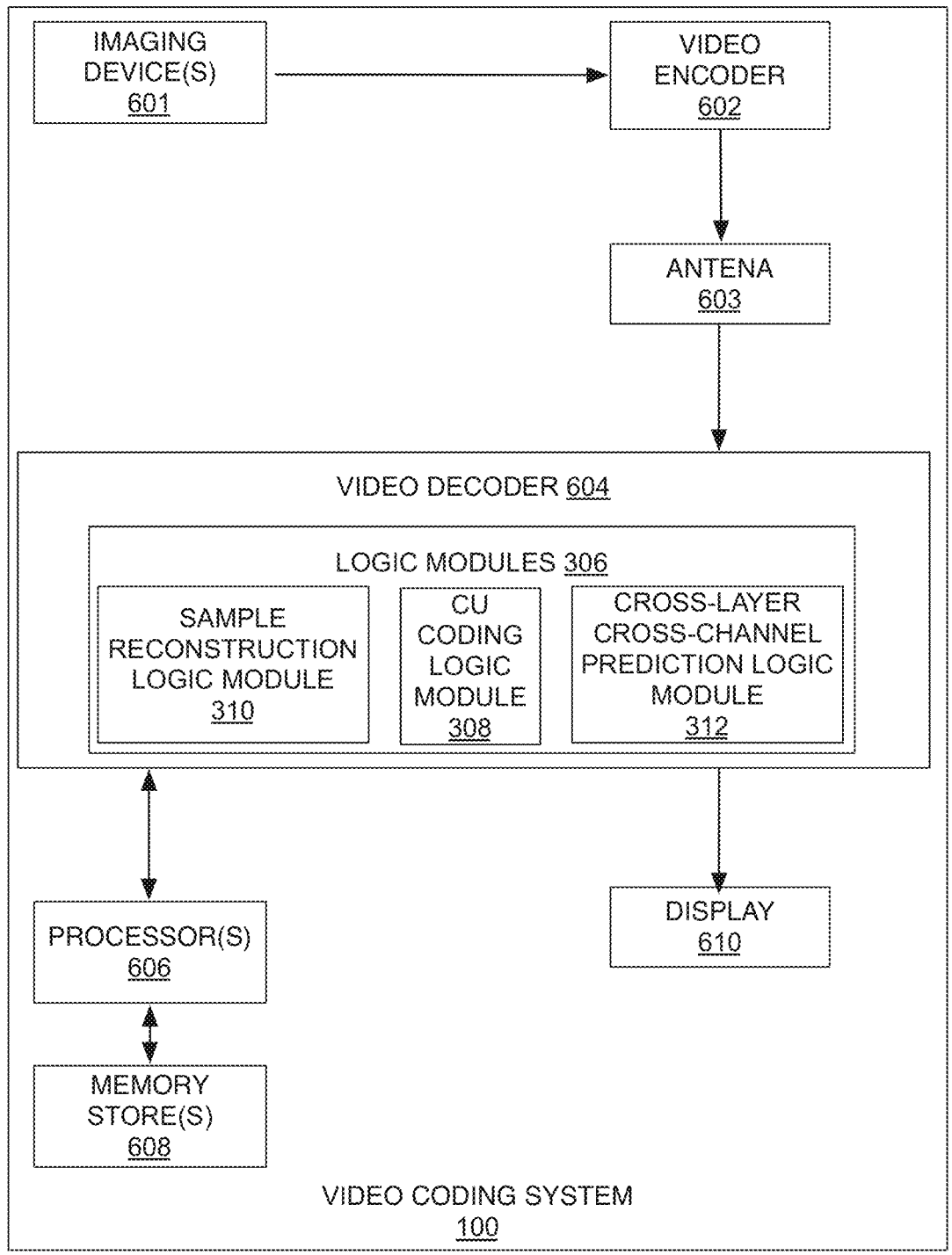
FIG. 6 is an illustrative diagram of an example video coding system.

FIG. 6 is an illustrative diagram of an example video coding system 100, arranged in accordance with at least some implementations of the present disclosure. In the illustrated implementation, video coding system 100 may include imaging device(s) 601, a video encoder 602, an antenna 603, a video decoder 604, one or more processors 606, one or more memory stores 608, a display 610, and/or logic modules 306. Logic modules 306 may include cu coding logic module 308, sample reconstruction logic module 310, cross-layer cross-channel prediction logic module 312, the like, and/or combinations thereof.

As illustrated, antenna 603, video decoder 604, processor 606, memory store 608, and/or display 610 may be capable of communication with one another and/or communication with portions of logic modules 306. Similarly, imaging device(s) 601 and video encoder 602 may be capable of communication with one another and/or communication with portions of logic modules 306. Accordingly, video decoder 604 may include all or portions of logic modules 306, while video encoder 602 may include similar logic modules. Although video coding system 100, as shown in FIG. 6, may include one particular set of blocks or actions associated with particular modules, these blocks or actions may be associated with different modules than the particular module illustrated here.

In some examples, video coding system 100 may include antenna 603, video decoder 604, the like, and/or combinations thereof. Antenna 603 may be configured to receive an encoded bitstream of video data. Video decoder 604 may be communicatively coupled to antenna 603 and may be configured to decode the encoded bitstream. Video decoder 604 may be configured to reconstruct a reference sample for a reference channel in a reference layer of video data. A determination may be made of a target prediction sample for a target channel in a target layer based at least in part on the reference sample via cross-layer cross-channel prediction, where the target channel may be a different channel than the reference channel. The target channel may be encoded based at least in part on the target prediction sample.

In other examples, video coding system 100 may include display device 610, one or more processors 606, one or more memory stores 608, cu coding logic module 308, sample reconstruction logic module 310, cross-layer cross-channel prediction logic module 312, the like, and/or combinations thereof. Display 610 may be configured to present video data. Processors 606 may be communicatively coupled to display 610. Memory stores 608 may be communicatively coupled to the one or more processors 606. Sample reconstruction logic module 310 of video decoder 604 (or video encoder 602 in other examples) may be communicatively coupled to the one or more processors 606 and may be configured to reconstruct a reference sample for a reference channel in a reference layer of video data. Cross-layer cross-channel prediction logic module 312 of video decoder 604 (or video encoder 602 in other examples) may be communicatively coupled to sample reconstruction logic module 310 and may be configured to determine a target prediction sample for a target channel in a target layer based at least in part on the reference sample via cross-layer cross-channel prediction. The target channel may be a different channel than the reference channel. Cu coding logic module 308 may be communicatively coupled to cross-layer cross-channel prediction logic module 312 and may be configured to code the target channel based at least in part on the target prediction sample.

In various embodiments, cu coding logic module 308, sample reconstruction logic module 310, and/or cross-layer cross-channel prediction logic module 312 may be implemented in hardware, while software may implement other logic modules. For example, in some embodiments, cross-layer cross-channel prediction logic module 312 may be implemented by application-specific integrated circuit (ASIC) logic while sample reconstruction logic module 310 may be provided by software instructions executed by logic such as processors 606. However, the present disclosure is not limited in this regard and cu coding logic module 308, sample reconstruction logic module 310, and/or cross-layer cross-channel prediction logic module 312 may be implemented by any combination of hardware, firmware and/or software. In addition, memory stores 608 may be any type of memory such as volatile memory (e.g., Static Random Access Memory (SRAM), Dynamic Random Access Memory (DRAM), etc.) or non-volatile memory (e.g. flash memory, etc.), and so forth. In a non-limiting example, memory stores 608 may be implemented by cache memory.

Figure 7:
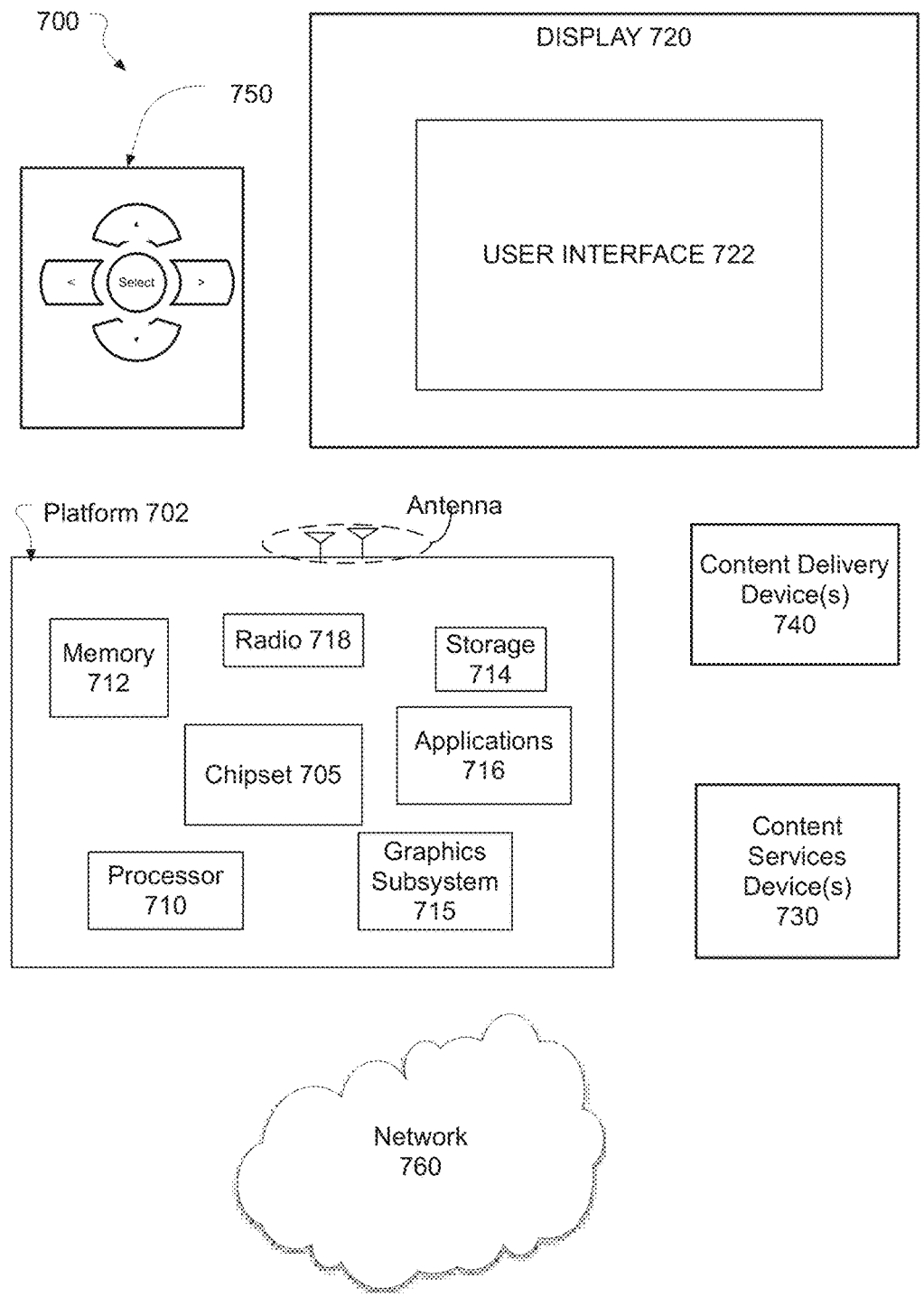
FIG. 7 is an illustrative diagram of an example system.

FIG. 7 illustrates an example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, Display Port, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multidimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 7.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
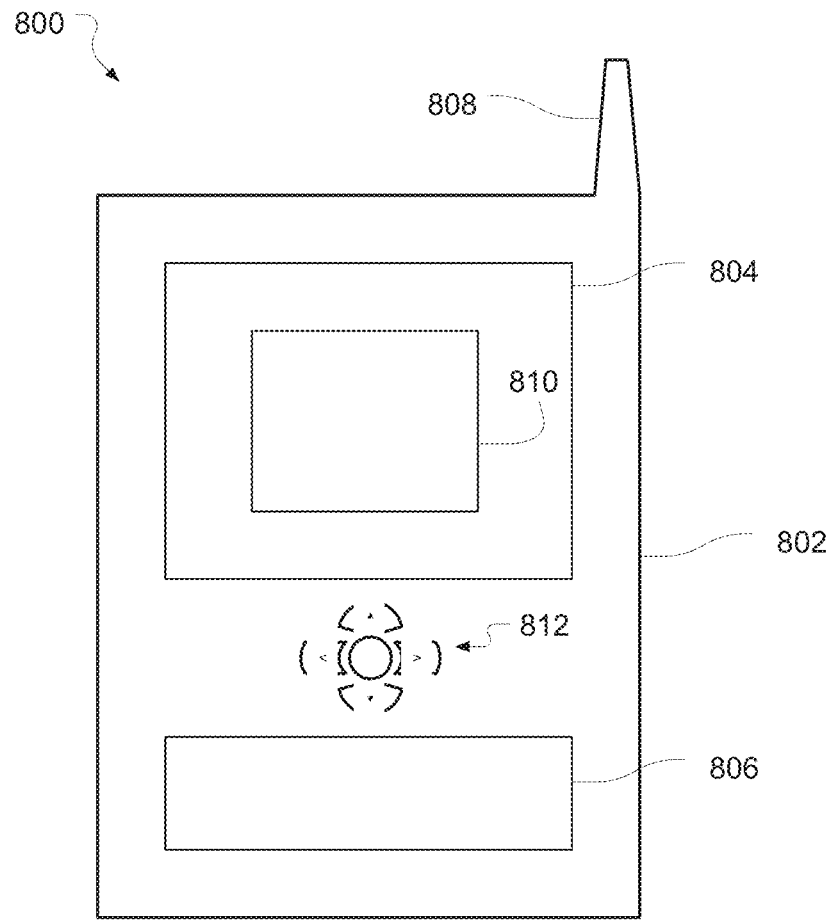
FIG. 8 is an illustrative diagram of an example system, all arranged in accordance with at least some implementations of the present disclosure.

As described above, system 700 may be embodied in varying physical styles or form factors. FIG. 8 illustrates implementations of a small form factor device 800 in which system 800 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include reconstructing a reference sample for a reference channel in a reference layer of video data. A determination may be made of a target prediction sample for a target channel in a target layer based at least in part on the reference sample via cross-layer cross-channel prediction, where the target channel may be a different channel than the reference channel. The target channel may be coded based at least in part on the target prediction sample.

In another example, a computer-implemented method for video coding may further include reconstructing a further reference sample for a further reference layer and/or for a further reference channel of the video data. The determination of the target prediction sample for the target channel in the target layer may be based at least in part on the further reference sample in addition to the reference sample. In some examples, the target layer may be the same layer as the reference layer. In other examples, the target layer may be a higher layer than the further reference layer and/or the target channel may be a different channel than the further reference channel. When the reference layer is a base layer, the target layer may be an enhancement layer. When the reference layer is an enhancement layer, the target layer may be a higher enhancement layer. When the reference channel is a luma channel, the target channel may be a chroma channel. When the reference channel is a chroma channel, the target channel may be one of a luma channel or another chroma channel. The determination of the target prediction sample may be performed during scalable video coding for one or more scalability types, including spatial scaling, temporal scaling, quality scaling, and bit-depth scaling. The determination of the target prediction sample for the target channel in the target layer may include selection of the reference layer and reference channel during decoding based at least in part on a flag associated with the target prediction sample during encoding. Parameter values may be processed by receiving, via a decoder portion of a coder, parameter values from an encoder portion of the coder. Alternatively, parameter values may be processed by determining, via a decoder portion of a coder, parameter values independent from and in parallel with an encoder portion of the coder. The parameter values may be associated with performing cross-layer cross-channel prediction. The determination of the target prediction sample may include applying one of a linear relation model or a non-linear relation model based at least in part on the parameter values. Model parameters may be processed by determining the target prediction sample by adaptively applying one of a one or more fixed relation model parameters. Alternatively, model parameters may be processed by adaptively determining one or more relation model parameters in response to model parameters associated with one or more layers and/or channels. The determination of the target prediction sample for the target channel via cross-layer cross-channel prediction may be adaptively applied based at least in part on a rate distortion cost.

In other examples, a system for video coding on a computer may include a display device, one or more processors, one or more memory stores, a sample reconstruction logic module, a cross-layer cross-channel prediction logic module, the like, and/or combinations thereof. The display device may be configured to present video data. The one or more processors may be communicatively coupled to the display device. The one or more memory stores may be communicatively coupled to the one or more processors. The sample reconstruction logic module of a video coder may be communicatively coupled to the one or more processors and may be configured to reconstruct a reference sample for a reference channel in a reference layer of video data. The cross-layer cross-channel prediction logic module of the video coder may be communicatively coupled to the sample reconstruction logic module and may be configured to determine a target prediction sample for a target channel in a target layer based at least in part on the reference sample via cross-layer cross-channel prediction, where the target channel may be a different channel than the reference channel.

In another example, the system for video coding on a computer may further include the sample reconstruction logic module being further configured to reconstruct a further reference sample for a further reference layer and/or for a further reference channel of the video data. The determination of the target prediction sample for the target channel in the target layer may be based at least in part on the further reference sample in addition to the reference sample. In some examples, the target layer may be the same layer as the reference layer. In other examples, the target layer may be a higher layer than the further reference layer and/or the target channel may be a different channel than the further reference channel. When the reference layer is a base layer, the target layer may be an enhancement layer. When the reference layer is an enhancement layer, the target layer may be a higher enhancement layer. When the reference channel is a luma channel, the target channel may be a chroma channel. When the reference channel is a chroma channel, the target channel may be one of a luma channel or another chroma channel. The determination of the target prediction sample may be performed during scalable video coding for one or more scalability types, including spatial scaling, temporal scaling, quality scaling, and bit-depth scaling. The determination of the target prediction sample for the target channel in the target layer may include selection of the reference layer and reference channel during decoding based at least in part on a flag associated with the target prediction sample during encoding. Parameter values may be processed by receiving, via a decoder portion of a coder, parameter values from an encoder portion of the coder. Alternatively, parameter values may be processed by determining, via a decoder portion of a coder, parameter values independent from and in parallel with an encoder portion of the coder. The parameter values may be associated with performing cross-layer cross-channel prediction. The determination of the target prediction sample may include applying one of a linear relation model or a non-linear relation model based at least in part on the parameter values. Model parameters may be processed by determining the target prediction sample by adaptively applying one of a one or more fixed relation model parameters. Alternatively, model parameters may be processed by adaptively determining one or more relation model parameters in response to model parameters associated with one or more layers and/or channels. The determination of the target prediction sample for the target channel via cross-layer cross-channel prediction may be adaptively applied based at least in part on a rate distortion cost.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
reconstructing a reference sample for a reference channel in a reference layer of video data and a second reference sample for a second reference channel in the reference layer of video data;
determining a target prediction sample for a target channel in a target layer based at least in part on: only the reference sample via cross-layer cross-channel prediction in a some instances, only the second reference sample via cross-layer cross-channel prediction in other instances, and both the reference sample and the second reference sample via cross-layer cross-channel prediction in still further instances; and wherein the target channel is always a different channel than the reference channel and the target layer is always a different layer than the reference layer during cross-layer cross-channel prediction; and
coding the target channel based at least in part on the target prediction sample;
wherein when the reference layer comprises a base layer, the target layer comprises an enhancement layer;
wherein when the reference layer comprises an enhancement layer, the target layer comprises a higher enhancement layer
wherein when the reference channel comprises a luma channel, the target channel comprises a chroma channel; and
wherein when the reference channel comprises a chroma channel, the target channel comprises one of a luma channel or another chroma channel.

2. The method of claim 1, wherein the determination of the target prediction sample is performed during scalable video coding for one or more scalability types including spatial scaling, temporal scaling, quality scaling, and bit-depth scaling.

3. The method of claim 1, further comprising:
reconstructing a further reference sample for a further reference layer and/or for a further reference channel of the video data.

4. The method of claim 1, further comprising:
reconstructing a further reference sample for a further reference layer and/or for a further reference channel of the video data,
wherein the determination of the target prediction sample for the target channel in the target layer is based at least in part on the further reference sample in addition to the reference sample, and
wherein the target layer is a higher layer than the further reference layer and/or the target channel is a different channel than the further reference channel.

5. The method of claim 1, wherein the determination of the target prediction sample for the target channel in the target layer comprises selection of the reference layer and reference channel during decoding based at least in part on a flag associated with the target prediction sample during encoding.

6. The method of claim 1, wherein determining the target prediction sample comprises applying one of a linear relation model or a non-linear relation model.

7. The method of claim 1, further comprising:
receiving, via a decoder portion of a coder, parameter values from an encoder portion of the coder, wherein the parameter values are associated with performing cross-layer cross-channel prediction, and
wherein determining the target prediction sample comprises applying one of a linear relation model or a non-linear relation model based at least in part on the parameter values.

8. The method of claim 1, further comprising:
determining, via a decoder portion of a coder, parameter values independent from and in parallel with an encoder portion of the coder, wherein the parameter values are associated with performing cross-layer cross-channel prediction, and
wherein determining the target prediction sample comprises applying one of a linear relation model or a non-linear relation model based at least in part on the parameter values.

9. The method of claim 1, wherein model parameters are processed via one or more of the following operations: determining the target prediction sample by adaptively applying one of a one or more fixed relation model parameters, and adaptively determining one or more relation model parameters in response to model parameters associated with one or more layers and/or channels.

10. The method of claim 1, wherein the determination of the target prediction sample for the target channel via cross-layer cross-channel prediction is adaptively applied based at least in part on a rate distortion cost.

11. The method of claim 1, further comprising:
reconstructing a further reference sample for a further reference layer and/or for a further reference channel of the video data,
wherein the determination of the target prediction sample for the target channel in the target layer is based at least in part on the further reference sample in addition to the reference sample,
wherein the target layer is a higher layer than the further reference layer and/or the target channel is a different channel than the further reference channel,
wherein the determination of the target prediction sample is performed during scalable video coding for one or more scalability types including spatial scaling, temporal scaling, quality scaling, and bit-depth scaling,
wherein the determination of the target prediction sample for the target channel in the target layer comprises selection of the reference layer and reference channel during decoding based at least in part on a flag associated with the target prediction sample during encoding,
wherein parameter values are processed via one or more of the following operations: receiving, via a decoder portion of a coder, parameter values from an encoder portion of the coder, and determining, via a decoder portion of a coder, parameter values independent from and in parallel with an encoder portion of the coder, wherein the parameter values are associated with performing cross-layer cross-channel prediction,
wherein determining the target prediction sample comprises applying one of a linear relation model or a non-linear relation model based at least in part on the parameter values,
wherein model parameters are processed via one or more of the following operations: determining the target prediction sample by adaptively applying one of a one or more fixed relation model parameters, and adaptively determining one or more relation model parameters in response to model parameters associated with one or more layers and/or channels, and wherein the determination of the target prediction sample for the target channel via cross-layer cross-channel prediction is adaptively applied based at least in part on a rate distortion cost.

12. A system for video coding on a computer, comprising:

a display device configured to present video data;

one or more processors communicatively coupled to the display device;

one or more memory stores communicatively coupled to the one or more processors;

a sample reconstruction logic module of the video coder communicatively coupled to the one or more processors and configured to reconstruct a reference sample for a reference channel in a reference layer of video data and a second reference sample for a second reference channel in the reference layer of video data; and a cross-layer cross-channel prediction logic module of a video coder communicatively coupled to the sample reconstruction logic module and configured to determine a target prediction sample for a target channel in a target layer based at least in part on: only the reference sample via cross-layer cross-channel prediction in a some instances, only the second reference sample via cross-layer cross-channel prediction in other instances, and both the reference sample and the second reference sample via cross-layer cross-channel prediction in still further instances; and wherein the target channel is always a different channel than the reference channel and the target layer is always a different layer than the reference layer during cross-layer cross-channel prediction;

wherein when the reference layer comprises a base layer, the target layer comprises an enhancement layer;

wherein when the reference layer comprises an enhancement layer, the target layer comprises a higher enhancement layer wherein when the reference channel comprises a luma channel, the target channel comprises a chroma channel; and wherein when the reference channel comprises a chroma channel, the target channel comprises one of a luma channel or another chroma channel.

13. The system of claim 12, wherein the sample reconstruction logic module is further configured to reconstruct a further reference sample for a further reference layer and/or for a further reference channel of the video data, wherein the determination of the target prediction sample for the target channel in the target layer is based at least in part on the further reference sample in addition to the reference sample, and wherein the target layer is a higher layer than the further reference layer and/or the target channel is a different channel than the further reference channel.

14. The system of claim 12, wherein the determination of the target prediction sample for the target channel in the target layer comprises selection of the reference layer and reference channel during decoding based at least in part on a flag associated with the target prediction sample during encoding.

15. The system of claim 12, wherein the sample reconstruction logic module is further configured to reconstruct a further reference sample for a further reference layer and/or for a further reference channel of the video data, wherein the determination of the target prediction sample for the target channel in the target layer is based at least in part on the further reference sample in addition to the reference sample, wherein the target layer is a higher layer than the further reference layer and/or the target channel is a different channel than the further reference channel, wherein the determination of the target prediction sample is performed during scalable video coding for one or more scalability types including spatial scaling, temporal scaling, quality scaling, and bit-depth scaling, wherein the determination of the target prediction sample for the target channel in the target layer comprises selection of the reference layer and reference channel during decoding based at least in part on a flag associated with the target prediction sample during encoding, wherein parameter values are processed via one or more of the following operations: receiving, via a decoder portion of a coder, parameter values from an encoder portion of the coder, and determining, via a decoder portion of a coder, parameter values independent from and in parallel with an encoder portion of the coder, wherein the parameter values are associated with performing cross-layer cross-channel prediction, wherein determining the target prediction sample comprises applying one of a linear relation model or a non-linear relation model based at least in part on the parameter values, wherein model parameters are processed via one or more of the following operations: determining the target prediction sample by adaptively applying one of a one or more fixed relation model parameters, and adaptively determining one or more relation model parameters in response to model parameters associated with one or more layers and/or channels, and wherein the determination of the target prediction sample for the target channel via cross-layer cross-channel prediction is adaptively applied based at least in part on a rte distortion cost.

16. A system comprising:

an antenna configured to receive an encoded bitstream of video data; and a video decoder communicatively coupled to the antenna and configured to decode the encoded bitstream, wherein the video decoder is configured to:

reconstruct a reference sample for a reference channel in a reference layer of video data and a second reference sample for a second reference channel in the reference layer of video data;

determine a target prediction sample for a target channel in a target layer based at least in part on: only the reference sample via cross-layer cross-channel prediction in a some instances, only the second reference sample via cross-layer cross-channel prediction in other instances, and both the reference sample and the second reference sample via cross-layer cross-channel prediction in still further instances; and wherein the target channel is always a different channel than the reference channel and the target layer is always a different layer than the reference layer during cross-layer cross-channel prediction; and decode the target channel based at least in part on the target prediction sample;

wherein when the reference layer comprises a base layer, the target layer comprises an enhancement layer;

wherein when the reference layer comprises an enhancement layer, the target layer comprises a higher enhancement layer wherein when the reference channel comprises a luma channel, the target channel comprises a chroma channel; and wherein when the reference channel comprises a chroma channel, the target channel comprises one of a luma channel or another chroma channel.

17. The system of claim 16, wherein the video decoder is further configured to reconstruct a further reference sample for a further reference layer and/or for a further reference channel of the video data, wherein the determination of the target prediction sample for the target channel in the target layer is based at least in part on the further reference sample in addition to the reference sample, and wherein the target layer is a higher layer than the further reference layer and/or the target channel is a different channel than the further reference channel.

18. The system of claim 16, wherein the determination of the target prediction sample for the target channel in the target layer comprises selection of the reference layer and reference channel during decoding based at least in part on a flag associated with the target prediction sample during encoding.

19. The system of claim 16, wherein the video decoder is further configured to reconstruct a further reference sample for a further reference layer and/or for a further reference channel of the video data, wherein the determination of the target prediction sample for the target channel in the target layer is based at least in part on the further reference sample in addition to the reference sample, wherein the target layer is a higher layer than the further reference layer and/or the target channel is a different channel than the further reference channel, wherein the determination of the target prediction sample is performed during scalable video coding for one or more scalability types including spatial scaling, temporal scaling, quality scaling, and bit-depth scaling, wherein the determination of the target prediction sample for the target channel in the target layer comprises selection of the reference layer and reference channel during decoding based at least in part on a flag associated with the target prediction sample during encoding, wherein parameter values are processed via one or more of the following operations: receiving, via a decoder portion of a coder, parameter values from an encoder portion of the coder, and determining, via a decoder portion of a coder, parameter values independent from and in parallel with an encoder portion of the coder, wherein the parameter values are associated with performing cross-layer cross-channel prediction, wherein determining the target prediction sample comprises applying one of a linear relation model or a non-linear relation model based at least in part on the parameter values;

wherein model parameters are processed via one or more of the following operations: determining the target prediction sample by adaptively applying one of a one or more fixed relation model parameters, and adaptively determining one or more relation model parameters in response to model parameters associated with one or more layers and/or channels, and wherein the determination of the target prediction sample for the target channel via cross-layer cross-channel prediction is adaptively applied based at least in part on a rate distortion cost.

\* \* \* \* \*